INVENTORS
Hidetake Kakihana
Takuya Gondo

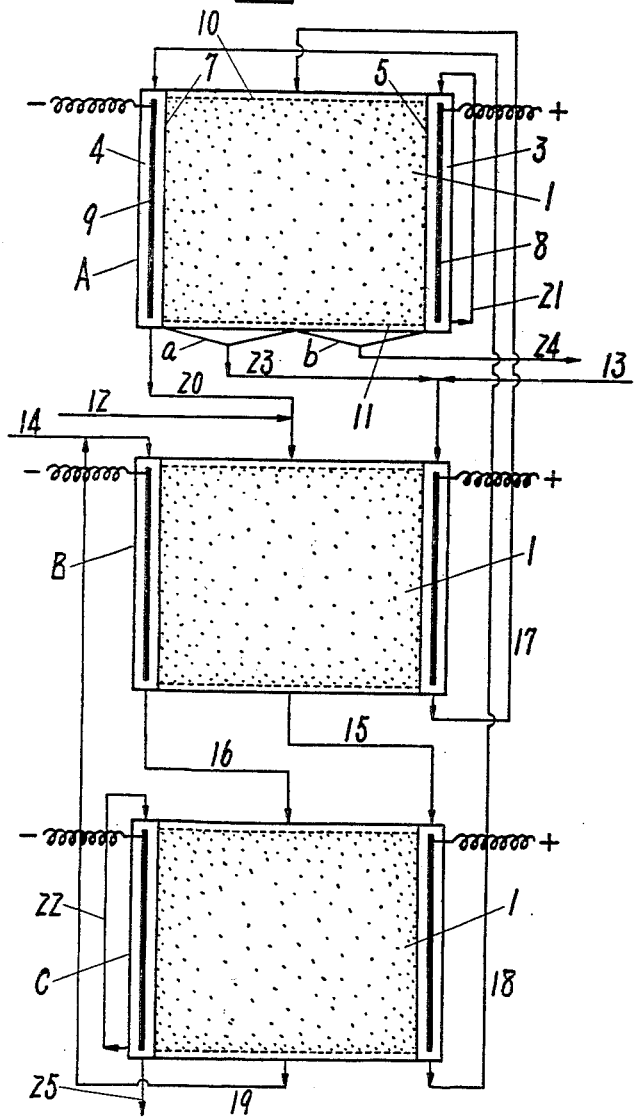

United States Patent Office 3,485,737
Patented Dec. 23, 1969

3,485,737
METHOD FOR CONTINUOUS SEPARATION OF IONS INVOLVING ELECTROMIGRATION IN A PACKED RESIN CHAMBER
Hidetake Kakihana and Takuya Gondo, Tokyo, Japan, assignors to Mitsubishi Chemical Industries Limited, Tokyo, Japan, a corporation of Japan, Power Reactor and Nuclear Fuel Development Corporation, Tokyo, Japan, a corporation of Japan and Hidetake Kakihana, Tokyo, Japan
Continuation of application Ser. No. 179,985, Mar. 15, 1962. This application Jan. 3, 1967, Ser. No. 607,073
Claims priority, application Japan, Mar. 17, 1961, 36/8,975
Int. Cl. B01j 1/08; B01k 1/00
U.S. Cl. 204—180                    5 Claims

ABSTRACT OF THE DISCLOSURE

A method for continuously separating two species of ions having an identical sign by passing a solution containing said ions downward through a vertical chamber packed with ion exchange resin beads while impressing an electrical field across said chamber thereby causing electromigration to take place to separate said species of ions and withdrawing the migrated ions separately from the lower end of the chamber.

Figure 1:
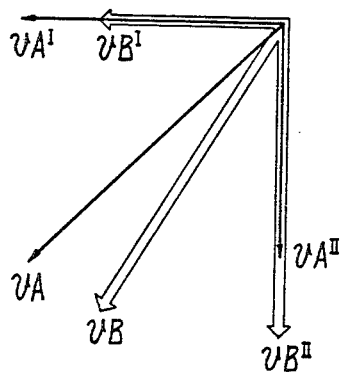

This is a continuation of application Ser. No. 179,985 filed Mar. 15, 1962, now abandoned.

This invention relates to a method for continuously separating ions, and particularly to a method for continuously separating ions of different species having an identical sign contained in an electrolyte solution.

There has been known the principle of the so-called ion exchange chromatography wherein ions of different species are separated by virtue of the difference between the migration velocities of ions in such ion separating medium as bed, zone, or membrane comprising ion exchanger by way of a physical, chemical, or electrical method, said velocity being diverse depending on the inherent nature of ions.

In accordance with the ion exchange chromatography, ions are allowed to migrate in the same direction so that front separation of ions is effected. For this reason it has not been possible according to the ion exchange chromatography to conduct a continuous operation on an industrial scale with economy for separating such ions especially of rare earth elements or isotopes as that the difference between the migration velocities is considerably small.

An objective of the invention is to provide a method for continuously and economically separating ions of different species having an identical sign contained in an electrolyte solution. The other objective of the invention resides in continuously and economically separating two species of isotopes of an element contained in an electrolyte solution.

These objectives are accomplished by a method according to the invention which comprises utilizing simultaneously two different ion migrating means for separating ions of two different species having an identical sign contained in an electrolyte solution by use of an ion separating medium and selecting respective ion migrating methods so as to allow ions to migrate in a respectively different direction.

The method according to the invention comprises dimensional separation of ions of two species having an identical sign. Hence, it is preferred to apply two ion migration means so that their directions are substantially perpendicular each other. The method of the present invention is superior to the conventional ion separation method in the prior art in respect of the separation effect of ions. Further, it is to be noted that since the individual separated components are continuously taken out from different positions according to the method of the invention, it becomes possible to conduct continuous operation on an industrial scale in a combination of plurality of the separation device.

The present invention will be described further in detail in the following.

Ions of two species having an identical sign to be separated by the method according to the invention imply such ions of different elements classified in an identical group that are similar, in general, in respect of physical and chemical properties and such isotopes of an identical element that have different mass number whereas the physical properties are slightly different from each other owing to the difference in the mass number although the chemical properties were believed identical. As far as elements of different species are concerned, for example, the objective of the method of the invention resides in the separation of Na and Li, Na and K, Ca and Sr, Nb and Ta, Zr and Hf, rare earth elements, etc. Further, it is also an outstanding features of the invention that the separation of such isotopes as $Li^6$ and $Li^7$, or $U^{235}$ and $U^{238}$ is effected.

The electrolyte solution to be employed for the method of the invention which contains ions of two species having an identical sign is a solution of such salts as carbonate, sulfate, chloride, nitrate, and citrate of respective ions, or complex salts and or hydroxides thereof, the concentration of the solution being from 0.01 to 10 mol. In some cases an electrolyte solution containing no ions to be separated is employed as an assistant medium in company with the aforementioned electrolyte solution. Two types of methods for causing ions to migrate which are applicable to the invention are selected from among such ones that make use of chemical ion exchange, electromigration, and osmosis owing to differences in concentration, pressure, centrifugal action, etc. Among them the most practical is a combination of the chemical ion exchange method with the electro-migration method for that the former is capable of converting the type of ions and of changing the ratio of elution velocity whereas the latter is adapted to control to a certain extent the ion migration velocity by adjusting the voltage to be impressed. As for ion separation medium to be applied to the ion exchange method such a medium is desirable that enhances to the greatest extent the difference between two migration velocities of two species of ions. For this purpose various types of organic or inorganic ion exchangers such as styrene-divinyl benzene type ion exchange resins, carboxylic type ion exchange resins, phenolic ion exchange resins, synthetic zeolite, zirconium salt, etc. are employed. These ion exchangers generally have functional groups of a sign, which is different from that of ions to be separated. In some cases, however, such ion exchangers that have functional groups of an identical sign or such zwitter-ionic exchangers that have both functional groups of an identical sign and functional groups of a different sign may be employed.

These ion exchangers are utilized generally in such solid form as beads, bed filled with the beads, membrane, stack of membranes, fibers, and textiles composed of the ion exchangers. In some cases, inactive solid materials in which a liquid organic ion exchanger is absorbed are employed.

The electrolyte solution containing ions of two species to be separated is supplied preferably with a linear velocity from 0.1 to 5000 cm./hr. into an ion separating medium comprising the aforementioned ion exchanger so that respective ion migration velocities will be in a range generally from 0.1 to 20 cm./hr. by selecting the concentration of the electrolyte solution, the properties of the ion exchanger, and other conditions.

The electro-migration method, another method that is applicable according to the invention comprises arranging electrodes at the both ends of ion separation medium and impressing between the electrodes electromotive force of direct current so that anions migrate towards the anode, and cations migrate towards the cathode. It is preferred to change the impressed electromotive force in a range from 0.1 to 10 v./cm. for the purpose of controlling the ion migration velocity.

The present invention relates to a method of separating ions in an electrolyte solution wherein the aforementioned two types of ion migration method are simultaneously conducted.

Figure 2:
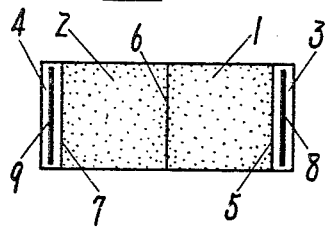
Figure 4:
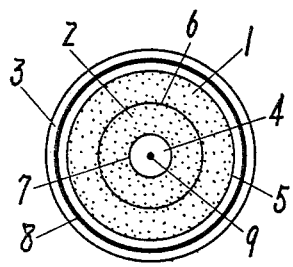
Figure 3:
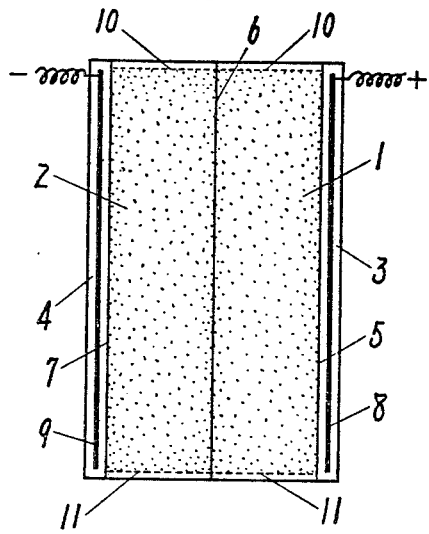
Figure 5:
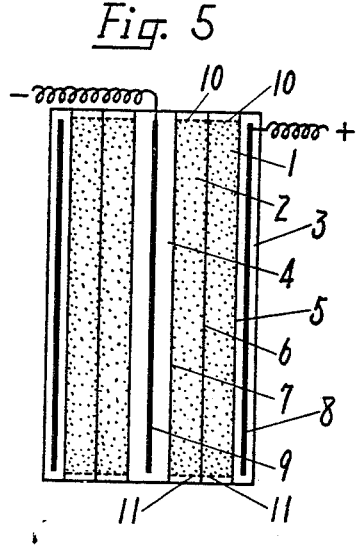

With reference to the attached drawings, FIG. 1 indicates the principle of the present invention; FIGS. 2 and 3 are the schematic views of an exemplary apparatus to be used for embodying the present invention; FIGS. 4 and 5 are the schematic views showing other exemplary apparatus by which the present invention is embodied; and FIG. 6 shows a schematic view of an apparatus comprising an associated unit.

The principle of the present invention for separating two species A and B of ions in an electrolyte solution is appreciated by reference to FIG. 1. In this FIGURE $vA^I$ and $vB^I$ denote the horizontal migration velocity of ion A and ion B, respectively. On the other hand, $vA^{II}$ and $vB^{II}$ denote, respectively, other migration velocities of ions A and B in the vertical direction. The displacement of ions A and B when both of these two migration methods are applied is indicated by $vA$ and $vB$, that are the sum of the vectors of the respective migration velocities. Since $vA^I/vB^I$ is in general not equal to $vA^{II}/vB^{II}$, and if $vA^I$ exceeds $vB^I$, it is possible to cause $vA^{II}$ to be smaller than $vB^{II}$ by selecting a suitable means, the respective migration directions of ions A and B are different from each other. Therefore, the separation in different directions of ions A and B is effected by way of continuous supply of an electrolyte solution containing said ions so that continuous singling out of components having both species of ions in a different proportion is made possible.

According to the present invention, it is also possible to separate ions such as isotopes, which are considerably small in the difference of their migration velocities, by reiterating the aforementioned separation method thereby enhancing in succession the degree of separation.

As for the mode of the preferred embodiments of the present invention, for example, a plurality of packed chambers 1 and 2 divided by a partition 6 as shown by FIGS. 2 and 3 are installed; the said chambers are filled with ion exchanger beads and the both exteriors of the said chambers are provided with an anode chamber 3 having an anode 8 and a cathode chamber 4 having a cathode 9 therein, respectively; an electrolyte solution to be treated is allowed to continuously flow through the said packed chamber 1 from an end thereof, e.g., the upper end to the other end, e.g., the lower end while simultaneously impressing electromotive force between the electrodes. The partitions 5, 6 and 7 supporting the said packed chambers 1 and 2 are preferred to be of such an ion exchanger membrane that is adapted to facilitate the difference between the ion migration velocities of two species of ions to be separated. The partitions 10, 11 supporting the packed chamber at the upper end and the lower end thereof are made of such porous materials as net and the like which do not hinder the passing of an electrolyte solution.

The present invention is also embodied by use of an apparatus of concentric circle type as shown by FIGS. 4 and 5. Further, an apparatus, e.g., that is shown by FIG. 6, comprising in combination of plurality of such apparatus that as shown by FIGS. 2 and 3, is especially advantageous from an industrial viewpoint.

Some preferred embodiments of the invention will be described in detail wherein the examples given are for the purpose of illustrating preferred embodiments only and not for the purpose of limiting the same.

EXAMPLE 1

Electro-migration method and chemical ion exchange method are simultaneously performed for separating Li ion and Na ion in an apparatus as shown by FIGS. 2 and 3. The apparatus, which is 40 cm. in height, 10 cm. in depth, and 24 cm. in width is provided with two chambers 1 and 2 divided 10 cm. wide each by three partitions 5, 6, 7, which are of cation exchange resin membranes. These chambers 1 and 2 are filled with cation exchange resin beads (Diaion SK–1 manufactured by applicants' assignees). A 0.05 N-aqueous solution containing $Li_2SO_4$ and $Na_2SO_4$ in an equivalent mol ratio is allowed to flow downwards from the upper end of the chamber 1 at a linear velocity of 80 cm./hr. so that the migration velocity of Li ion becomes about 1.15 cm./hr. and that of Na ion becomes about 0.85 cm./hr. Simultaneously, a 0.05 N-$(NH_4)_2SO_4$ aqueous solution is allowed to flow downwards from the upper end of the chamber 2 at the same velocity. Into the anode chamber 3 and the cathode chamber 4 is allowed to flow a 0.05 N-$(NH_4)_2SO_4$ aqueous solution while impressing an electromotive force of about 100 v., the current density being 19 ma./cm.$^2$. Thus Na ion and Li ion migrate from the chamber 1 towards the chamber 2 with the migration velocity of 2.0 cm./hr. and 1.8 cm./hr., respectively. An equilibrium is attained 10 hours later. The electrolyte solution obtained from the cathode chamber 4 during from 10 to 20 hours was found to contain $(NH_4)_2SO_4$ mixed with $Na_2SO_4$ of about 1.75 mol and $Li_2SO_4$ of 0.2 mol. A liquid flown out of the lower portion of the chamber 2 was found to contain mainly $Li_2SO_4$ in the amount of 1.8 mol. This liquid also contained $Na_2SO_4$ of 0.25 mol and $(NH_4)_2SO_4$ of about 0.1 mol.

Although an apparatus of rectangular type as shown by FIGS. 2 and 3 was employed in this example, an apparatus of concentric circle type as shown by FIGS. 4 and 5 may also be utilized for embodying the invention. The apparatus shown by FIGS. 4 and 5 comprises chambers 1 and 2 in which ion exchange resin beads are filled and which are divided by ion exchange membranes 5 and 6, respectively. In the anode chamber 3 and the cathode chamber 4 are installed the anode 8 and the cathode 9, respectively. The similar results are obtained by use of said apparatus while performing the similar operations as in the foregoing.

EXAMPLE 2

The concentration of $Li^6$ and $Li^7$, isotopes of lithium is performed in an apparatus, which is shown by FIGS. 2 and 3. A 0.0430 N-$Li_2CO_3$ aqueous solution having isotope ratio $Li^7/Li^6 = 12.19_6$ is allowed to continuously flow downwards from the upper portions of the chambers 1 and 2 at a rate 15 l./hr., respectively. In the meantime a 0.5 N-$(NH_4)_2SO_4$ aqueous solution is permitted to circulate in the anode chamber 3 and the cathode chamber 4, respectively. As an electromotive force is impressed between the electrodes 8 and 9, lithium ions migrate towards the cathode chamber 4 until an equilibrium is attained in 35 hours indicating 100 v. in voltage and 18 ma./cm.$^2$ in current density whereas the concentration of lithium ions and the isotope ratio ($Li^7/Li^6$) of the runoff liquid from the lower end of the cathode chamber 4, the chambers 1 and 2 were found as follows:

| Runoff liquid from | Concentration of Li | Isotope ratio $Li^7/Li^6$ |
|---|---|---|
| Cathode chamber 4 | 0.0295N | 12.11$_1$ |
| Chamber 2 | 0.0517 | 12.19$_3$ |
| Chamber 1 | 0.0190 | 12.27$_3$ |
| Flow-in liquid | 0.0430 | 12.19$_6$ |

5

The abovementioned results show that the concentration of $Li^6$ and $Li^7$ was performed towards the cathode chamber 4 and the chamber 1, respectively. For the purpose of comparison, an experiment was performed in the same conditions as in the abovementioned example excepting no electric current was applied. In accordance with the experiment each of the runoff liquids from the cathode chamber 4, the chambers 1 and 2 after attaining an equilibrium was found equivalent to the flow-in liquid in respect of isotope ratio ($Li^7/Li^6$).

EXAMPLE 3

The concentration of $Li^6$ and $Li^7$, the isotopes of lithium was effected by performing electro-migration method and ion exchange method in a combined apparatus shown in FIG. 6.

This apparatus comprises three units of box A, B and C having an identical structure. The box is 40 cm. in height, 10 cm. in length, and 54 cm. in width. The box is divided by means of two sheets of cation exchanger membranes 5 and 7 into three chambers, i.e., the chamber 1 which is 50 cm. wide, the anode chamber 3, and the cathode chamber 4. The anode 8 and the cathode 9 are installed in the anode chamber 3 and the cathode chamber 4, respectively. The chamber 1 is filled with styrene-divinylbenzene cation exchanger resin beads (Diaion Ski manufactured by Applicants' assignee) of 100 to 200 mesh. A 0.05 N–$Li_2SO_4$ aqueous solution ($Li^7/Li^6=12.20$), a 0.05 N–$Li_2SO_4$ aqueous solution ($Li^7/Li^6=12.50$), and a 0.05 N–$Li_2SO_4$ aqueous solution ($Li^7/Li^6=11.90$) are allowed to continuously flow downwards at rate of 40 l./hr., respectively, from the upper end of the chamber 1 of the box B via line 12, from the upper portion of the anode chamber 3 of the box B via line 13, and from the upper portion of the cathode chamber 4 of the box B via line 14. The runoff liquid from the lower end of the chamber 1 of the box B, the runoff liquid from the lower end of the cathode chamber 4 of the box B, the runoff liquid from the lower portion of the anode chamber 3 of the box B, the runoff liquid from the anode chamber 3 of the box C, the runoff liquid from the lower end of the chamber 1 of the box C, and the runoff liquid from the cathode chamber 4 of the box A are caused to circulate, respectively, towards the upper end of the anode chamber 3 of the box C via line 15, towards the upper end of the chamber 1 of the box C via line 16, towards the upper end of the chamber 1 of the box A via line 17, towards the upper end of the cathode chamber 4 of the box A via line 18, towards the upper portion of the cathode chamber 4 of the box B via line 19, and towards the upper portion of the chamber 1 of the box B via line 20. In addition, a 0.05 N–$(NH_4)_2SO_4$ aqueous solution is caused to circulate in the anode chamber 3 of the box A and the cathode chamber 4 of the box C via lines 21 and 22, respectively. A steady state is attained in 35 hours after having impressed an electromotive force between the electrodes 8 and 9 of the respective boxes, recording 220 V in voltage between the electrodes and 20.5 ma./cm.$^2$ in current density. The runoff liquid from the portion indicated as ($a$) in FIG. 6 which is one outlet of the chamber 1 of the box A is permitted to circulate via line 23 towards the upper end of the anode chamber 3 of box B whereas the runoff liquid from the portion indicated as ($b$) which is another outlet of the chamber 1 of the box A is taken out of the operation system via line 24. The runoff liquid from the lower end of the cathode chamber 4 of the box C is taken out of the operation system via line 25.

The abovementioned cycle attained to an equilibrium in about 75 hours and the isotope ratio ($Li^7/Li^6$) of the runoff liquid taken out thereafter from the lower line 24 of the chamber 1 of the box A was found 12.80 whilst that of the runoff liquid taken out from the lower line 25 of the cathode chamber 4 of the box C was found 11.60.

6

Although an operation in an apparatus in combination of three stages has been illustrated in the foregoing, it is feasible to effect further excellent concentration of isotopes according to the invention by means of an apparatus in combination of still further plurality of stage.

EXAMPLE 4

The concentration of the isotopes of U is effected by performing simultaneously electro-migration method and chemical ion exchange method in an apparatus as shown by FIGS. 2 and 3.

This apparatus is 100 cm. high, 1 cm. long, and 5 cm. wide and divided into two chambers 1 and 2, which are 2 cm. wide each, by means of three sheets of cation exchange resin membranes 5, 6, and 7, said chambers being filled with styrene-divinyl benzene series cation exchange resin beads (Diaion Ski of applicants' assignee) of 100 to 200 mesh. A 0.5 N–HCl solution containing 0.1 mol of $U^{4+}$, natural isotopes ratio, i.e., the abundance ratio of $U^{235}$ being 0.715%, is allowed to flow downwards from the upper portion of the chamber 1 at a rate of 99 ml./hr. whilst a 0.5 N–HCl solution is allowed to flow downwards from the upper end of the chamber 2. In the anode chamber 3 and the cathode chamber 4 a 0.5 N–HCl solution is caused to circulate from the lower end towards the upper end of said chambers at a rate of 52 ml./hr. and 48 ml./hr., respectively. The impression of electromotive force of 5 v. between electrodes 8 and 9 generates a flow of an electric current of about 150 ma./cm.$^2$ which attains an equilibrium in 15 hours.

The change in the concentration of $U^{4+}$ and the abundance ratio of $U^{235}$ in the runoff liquids from the chambers 1 and 2, the anode chamber 3, and the cathode chamber 4 after the equilibrium has been attained is shown below:

|  | $U^{4+}$ concentration in mg. $U^4$/l. | Change in abundance ratio of $U^{235}$ in percent |
|---|---|---|
| Cathode chamber 4 | 4.58 | +0.0039 |
| Chamber 2 | 20.3 | −0.0004 |
| Chamber 1 | 0.6 | −0.0013 |
| Anode chamber 3 | 0 | |

Note: Abundance ratio of $U^{235}$ in the starting liquid is 0.715%.

As is obvious from the above table, the concentration of $U^{235}$ in the runoff liquid from the cathode chamber 4 is apparently effected. A liquid containing further condensed $U^{235}$ may be obtained by use of an apparatus, which is a combination of larger number of such apparatus as has been illustrated.

Another operation was performed in the same conditions as in the above excepting the impression of an electromotive force. In accordance with this operation, the presence ratio of $U^{235}$ in the initial 30 cc. of the runoff liquid from the chamber 1 decreased by 0.014% as compared with that of the starting flow-in liquid, but after 2 hours equilibrium is attained, the concentration of $U^{235}$ in the runoff liquid was found the same to that of the starting flow-in liquid. There was no change in the presence ratio of $U^{235}$ of the runoff liquids from the chamber 2 and the anode chamber 3.

What is claimed is:

1. A method for continuously separating two species of ions having an identical sign contained in an electrolyte solution by use of an ion separation medium which is characterized in providing at least four chambers in vertical position, the outermost chambers being respectively an anode and a cathode chamber, at least two chambers intermediate said outer chambers, said intermediate chambers being packed with ion exchange resin beads and each of said chambers being separated by vertical permeable membranes, flowing a solution containing two species of ions having an identical sign downwardly through at least one of said intermediate chambers, flowing a different solution substantially free from said ions to be separated downwardly through said anode and cathode chambers and all of said intermediate chambers other than ones for flowing said solution containing two species of ions having an identical sign, impressing an electric field on said solutions through said anode and cathode, causing electromigration to take place to separate said species of ions through said membranes, said solution flowing to the lower end of the respective chambers, and withdrawing the migrated ions separately from said lower end.

2. A method according to claim 1 characterized in that a force of said electromigration is osmosis.

3. A method according to claim 2 characterized in that said osmosis is obtained by differences in concentration and pressure of said solution.

4. A method according to claim 1 characterized in that said solutions flow downwardly at the rate of 0.1 to 5,000 cm./hr.

5. A method according to claim 1 characterized in that the electromotive force impressed on said solutions is from 1 to 100 v./cm. between the anode chamber and the cathode chamber.

References Cited

UNITED STATES PATENTS

| | | | |
|---|---|---|---|
| 2,555,487 | 6/1951 | Haugaard et al. | 204—299 X |
| 2,645,610 | 7/1953 | Madorsky | 204—263 |
| 2,678,132 | 5/1954 | Beard | 210—33 |
| 2,741,591 | 4/1956 | Dewey et al. | |
| 2,812,300 | 11/1957 | Pearson | 204—180 |
| 3,014,855 | 12/1961 | Kressman | 204—180 |
| 3,085,956 | 4/1963 | Caplan | 204—180 |

FOREIGN PATENTS

| | | |
|---|---|---|
| 815,154 | 6/1959 | Great Britain. |
| 679,278 | 9/1952 | Great Britain. |
| 716,875 | 10/1954 | Great Britain. |

OTHER REFERENCES

Walters: "Concentration of Radio Aqueous Wastes," Industrial and Engineering Chemistry, pp. 61–66, January 1955.

Lederer: Chromatography, "Ion Exchange Chromatography," pp. 92–303, 1957.

Lederer: Chromatographic Reviews, "Separation of Isotopes," vol. I, pp. 246, 267, 1959.

Chemla, M.: "Separation of Isotopes by Chromatography and by Electrophores," in Chromatographic Reviews, ed. by M. Lederer, vol. 1, 1959, pp. 246–251.

Walters et al.: "Concentration of Radioactive Aqueous Wastes," Industrial and Engineering Chemistry, vol. 47, No. 1, January 1955, pp. 61–66.

Wilson et al.: "The Electrodialysis Process" in Demineralization by Electrodialysis, ed. by J. R. Wilson, 1960, pp. 37 to 39.

JOHN H. MACK, Primary Examiner

E. ZAGARELLA, Assistant Examiner

U.S. Cl. X.R.

204—301